United States Patent
Adams

(10) Patent No.: US 6,773,663 B2
(45) Date of Patent: Aug. 10, 2004

(54) OXIDATION AND WEAR RESISTANT RHENIUM METAL MATRIX COMPOSITES

(75) Inventor: Robbie J. Adams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 117 days.

(21) Appl. No.: 10/138,090

(22) Filed: May 3, 2002

(65) Prior Publication Data

US 2003/0206824 A1 Nov. 6, 2003

Related U.S. Application Data

(63) Continuation-in-part of application No. 10/138,087, filed on May 3, 2002, now Pat. No. 6,749,803.

(51) Int. Cl.⁷ ............................................... C22C 28/00
(52) U.S. Cl. ........................ 420/433; 148/407; 148/442
(58) Field of Search ......................... 420/433; 148/407, 148/442

(56) References Cited

U.S. PATENT DOCUMENTS

| | | | |
|---|---|---|---|
| 4,067,742 A | 1/1978 | Fletcher et al. ............... | 106/43 |
| 4,117,565 A | 10/1978 | Asada et al. | |
| 4,155,660 A | 5/1979 | Takahashi et al. .......... | 400/124 |
| 4,180,399 A | 12/1979 | Asada et al. | |
| 4,380,471 A | 4/1983 | Lee et al. ..................... | 419/11 |
| 4,432,794 A | 2/1984 | Holleck ........................ | 75/239 |
| 4,985,051 A | 1/1991 | Ringwood .................... | 51/309 |
| 5,403,547 A * | 4/1995 | Smith et al. ................. | 420/581 |
| 5,476,531 A | 12/1995 | Timm et al. .................. | 75/240 |
| 5,577,263 A | 11/1996 | West ............................ | 428/552 |
| 5,704,538 A | 1/1998 | Mittendorf ................... | 228/194 |
| 5,824,425 A | 10/1998 | Mittendorf ................... | 428/655 |
| 5,897,830 A | 4/1999 | Abkowitz et al. | |
| 6,127,047 A | 10/2000 | Worrell et al. ............... | 428/615 |
| 6,284,357 B1 | 9/2001 | Lackey et al. ............... | 428/220 |

FOREIGN PATENT DOCUMENTS

| | | | | |
|---|---|---|---|---|
| EP | 1 123 908 | 8/2001 | ........... | C04B/35/38 |
| RU | 1804141 | 5/1996 | ........... | C22C/27/00 |

* cited by examiner

Primary Examiner—Andrew L. Oltamans
(74) Attorney, Agent, or Firm—Douglas A. Mullen, Esq.

(57) ABSTRACT

An alloy and metal matrix composite (MMC) based on a refractory metal such as rhenium resists oxidation by the inclusion of alloying substances with affinity for oxygen or other oxidizing substances. Rhenium enjoys excellent high temperature strength but oxidizes at a much lower temperature. This reduces its desirability for hot, stressed environments. The addition of substances, such as soluble metals, that attract oxygen may form a protective oxide layer over the remaining portion of the rhenium-alloy part or piece. Such soluble alloying constituents may include chromium, cobalt, nickel, titanium, thorium, aluminum, hafnium, vanadium, silicon, aluminum, and yttrium. The addition of second phase fiber or particulates such as carbides of silicon, tungsten, titanium and/or boron provides additional wear resistance in the formation of a resulting metal matrix composite (MMC).

33 Claims, No Drawings

OXIDATION AND WEAR RESISTANT RHENIUM METAL MATRIX COMPOSITES

CROSS-REFERENCES TO RELATED APPLICATIONS

This patent application is a continuation-in-part of the U.S. patent application Ser. No. 10/138,087 filed May 3, 2003 entitled Oxidation Resistant Alloys initially having Honeywell invented by the same inventor for and filed on or about the same date as the instant application, which application is incorporated herein by this reference thereto.

BACKGROUND OF THE INVENTION

1. Field of the Invention

This invention relates to wear-resistant materials and more particularly to wear-resistant composite materials derived from refractory metals such as rhenium

2. Description of the Related Art

Material sciences seeks to exploit from available resources, namely those elements of the periodic table of elements, different materials having different characteristics that can be used for a variety of purposes and applications. Consequently, there is a great interest in developing conductors, insulators, soft materials, and hard materials from available substances and materials.

With respect to engines and mechanical components, wear resistance is typically a desired characteristic because it allows materials to last a longer time and consequently enjoy a cheaper cost per unit time. Even though a part may cost twice as much, it may last four times as long so is then approximately half as expensive as a cheaper part.

One particularly useful metal is elemental rhenium. Rhenium has atomic number 75 in the periodic table of elements. It is known as a refractory metal which means it has a very high melting point as compared to other materials. Despite the fact that it has a very high melting point, rhenium is not necessarily wear-resistant. Rhenium metal melts at approximately 5756° F. (3180° C., 3453° Kelvin). However, rhenium begins to oxidize at a much lower temperature, at approximately 1000° F. (538° C., 811° K). Rhenium retains excellent ultrahigh temperature strength of approximately 6–9 Ksi (kips per square inch, 1000 pounds per square inch) at 4000° F. (2204° C., 2477° K). Far before it reaches this temperature, the oxidation temperature of rhenium becomes a factor and the oxidation of rhenium produces a volatile oxide that will continually evaporate from the surface of the rhenium part until the part has entirely vaporized.

This can lead to catastrophic failure as can be readily perceived as the evaporation of a part during operation would be much like the boiling away of a part made of dry ice. However, where oxygen is lacking, rhenium has been shown to retain high strength and to resist severe corrosion and wear both in established literature as well as independent tests. Such properties are present at room temperature operation and remain with rhenium even though the temperatures are elevated.

In prior literature, relevant alloying includes development of phase diagrams for several binary alloys of rhenium as well as rhenium-enhanced alloys such as those based on tungsten where rhenium is added to the matrix to enhance resulting properties. In such prior literature, rhenium has been a part of binary alloys such as in tungsten to increase ductility.

Rhenium has also been studied for its effect on chromium-based alloys. For steel, alloys with chromium are known that alloy the creation of "stainless steel." When alloyed with chromium in amounts greater than 11%, steel converts from a highly oxidation prone substance to a more corrosion-resistant alloy with the general elimination of rust. Similar concepts are known for use in "super alloys" and corrosion-resistive alloys.

In order to further enhance the wear resistance of a resulting alloy, a hard second phase can be introduced into the metal matrix of the alloy to produce a metal matrix composite. Such metal matrix composite (MMC) may use ceramic fibers such as those from alumina and/or silicon carbide to reinforce metal alloys based on such metals as aluminum and titanium. The m resulting materials are stiffer and lighter than the parent alloys and also have a high resistance to wear. Beyond the provision of a basic alloy, additional wear resistance can be introduced into metals by providing an additional second phase in order to increase the wear resistance.

However, the prior art does not well reflect the establishment of oxidation-resistant rhenium-based alloy. Consequently, as there is always a need for better materials and materials having better wear characteristics, the present invention provides a solution to a need that will always be felt for better materials.

Additionally, the art has not well addressed the wear that concentrates at small asperities which are microscopic metal protrusions that generally cause roughness on a surface such as a cast or focused metal. With respect to rhenium-based alloys, wear could be focused on such asperities and such wear would by friction create significant heat that would cause an alloyed rhenium to oxidize and vaporize.

SUMMARY OF THE INVENTION

In view of the foregoing disadvantages inherent in the known types of alloys, materials, and metal matrix composites (MMCs) now present in the prior art, the present invention provides a family of new wear-resistant rhenium-based MMCs wherein the same can be used in environments where unalloyed or pure rhenium would be subject to oxidation and/or vaporization while providing an increased degree of wear resistance.

The general purpose of the present invention, which will be described subsequently in greater detail, is to provide better materials for use in mechanically or otherwise stressful operating environments in order to provide better wear characteristics and function which are not anticipated, rendered obvious, suggested, or even implied by any of the prior art alloys and MMCs, either alone or in any combination thereof.

The present invention takes a refractory metal, particularly rhenium, that is subject to oxidation well below its melting point and well below the temperature at which it loses strength and strengthens the metal by selective combination to achieve an alloy that better resists oxidation and that has better wear characteristics. The refractory metal is combined with other alloying materials, such as metals, that have a strong affinity for oxygen. Such alloying materials include the metals chromium, cobalt, nickel, titanium, thorium, aluminum, hafnium, and related elements on the periodic table. These particular elements are at least somewhat soluble in rhenium, if not completely soluble.

It is believed that such elements protect rhenium by forming an oxide on its surface. Once the oxide has formed on the surface of the alloyed part, further attack by oxygen is prevented by the oxide coating. This is a phenomenon that is well-known with aluminum that oxidizes in oxygen, but once the surface of an aluminum object has oxidized, further oxidation is prevented as oxygen can not get to the unoxidized aluminum below the oxidized surface layer.

Consequently, those metals or other alloying agents that oxidize to form high boiling point oxides may well aid in the protection of the underlying rhenium alloy.

Using powder metallurgy, and possibly using free form fabrication (FFF) or casting, parts and components can be fabricated from rhenium-based alloys having oxygen-attracting qualities. The use of such techniques may render useful alloys with better wear and lower oxidation characteristics.

Additionally, the addition of a second phase in order to create a metal matrix composite (MMC) is disclosed in order to enhance the wear resistance of the resulting composite. The second phase may be silicon carbide but tungsten carbide, titanium carbide, boron carbide and the like will also enhance the matrix alloy's wear resistance properties. These second phase materials may be in the form of continuous fibers, short fibers (or whiskers), particulates/particles. Preferably, the second phase in the form of granular particles as it is believed that this form of the second phase better enhances the wear resistance properties of the resulting composite and makes formation easier. Other features and advantages of the present invention will become apparent from the following description of the preferred embodiments which illustrate by way of example the principles of the invention.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The present invention is achieved by initially obtaining some amount of pure rhenium in order to provide a better and unadulterated alloy. Rhenium is a refractory metal and the process described herein may apply to other refractory metals that require protection from oxidation in order to obtain better wear-resistant characteristics or otherwise.

The alloys set forth herein may be fabricated by powder metallurgy at relatively low pressures and temperatures for refractory metals, on the order of 3,000–4,000 psi (pounds per square inch) at approximately 1800° F. (982° C., 1255.15° K) for rhenium. Alternatively, free form fabrication (FFF) or casting may also provide good results. This last option of casting is generally difficult and costly due to the very high melting temperature of rhenium. Additionally, due to the oxidation characteristics of rhenium, the ambient environment in which rhenium alloy is formed (as by powder metallurgy, free-form fabrication, and/or casting) may need to be neutral, reducing, and/or under vacuum in order to avoid oxidation. Practically, powder metallurgy and free form fabrication techniques are believed to be the most effective.

In terms of atomic percent, an alloy composed of 60% rhenium, 20% cobalt, 15% chromium, and 5% magnesium has shown to lower the oxidation rate of pure rhenium by a factor of 10. Additional alloys using various percentages of cobalt, chromium, manganese, nickel, vanadium, silicon, aluminum, yttrium, titanium, thorium, hafnium, or other elements may also be used either alone or in combination with each other. Other elements or substances with affinity for oxygen that produce oxidation-protective coating for the underlying rhenium or rhenium alloy are appropriate for use in order to achieve the present invention. Additionally, such alloying substances are believed to be more effective if they are at least, if not completely, soluble in rhenium.

In one embodiment, a minimum of 50% rhenium atomic percent may be combined with cobalt in order to produce an alloy with desired characteristics. The atomic percent of cobalt may range from approximately 0% to 50%. Additionally, chromium may be added in an amount ranging from approximately 10–15% by atomic percent.

In another embodiment, known in the trade as Honeywell Alloy HRA33, the atomic percentages are as follows: rhenium approximately 55%, cobalt approximately 20%, chromium approximately 10%, nickel approximately 10% and manganese approximately 5%.

The alloys created herein cannot only be used as material by which components or parts may be formed, but also as a coating under which rhenium or other core components could be protected from oxidation and/or to increase wear resistance in elevated temperature environments such as those arising in operating jet engines. Under such circumstances, matching of coefficients of thermal expansion may prove useful and further research may be performed in this area. It is believed that those of ordinary skill in the art would not have to perform undue experimentation in order to achieve the alloys set forth herein in order to obtain the desired characteristics. Similarly, the same is also believed to be true for the use of the alloy of the present invention for coating underlying materials.

Once the alloy has been prepared or, in order to avoid high casting temperatures, prior to the alloying process, second phase elements can be added to the alloy or pre-alloy in order to ultimately produce a metal matrix composite (MMC) that has additional wear resistance capacity as well as enjoying the oxidation resistance of the resulting alloy.

Continuous fibers, whiskers (short fibers), or granular particulate can be added to the precast melt or pre-alloy mixture in order to achieve the MMC with the enhanced characteristics. Materials for use as the second phase include silicon carbide as a presently preferred embodiment of the second phase. However, other carbides (such as those of tungsten, titanium, boron, etc.) can also be used to good effect.

If prepared in powdered form, the resulting combination of pre-alloy and second phase constituents can be combined in a powder for use in free-form fabrication techniques including laser sintering systems. Such techniques generally cause the edges of powder particles melt upon absorbing sufficient energy and then fuse in order to create the resulting solid. Such free-form fabrication techniques can result in net-shape or near-net-shape components that enjoy resistance to oxidation and wear while additionally requiring less post-manufacture machining in order to meet the tolerances necessary for the resulting part or device.

The inclusion of second phase particles enable them to bear all or part of the wear load instead of the alloy surface. For second phase materials such as silicon carbide, high thermal wear properties of the second phase aid in the reduction of surface temperature during the application and wear stress. The use of an intrinsically wear-resistant matrix such as the rhenium alloys described herein make the resulting metal matrix composite significantly more wear-resistant as the alloy provides support in its own right.

While casting, powder metallurgy, and free form fabrication (FFF) may be effectively used to achieve the metal matrix composites of the present invention, powder metallurgy techniques are currently seen as being the most effective at present. One embodiment of a metal matrix composite in accordance with the invention herein may have a nominal composition of 20% cobalt, 15% chromium, 5% manganese, and 60% rhenium (HRA30). Unless otherwise specified, all percentages set forth herein are atomic percentages. A second alloy known as Honeywell rhenium alloy (H1RA33) includes 20% cobalt, 10% nickel, 10% chromium, 5% manganese, and 55% rhenium. This embodiment, HRA33, produces an alloy with an oxidation resistance approaching that of 304 stainless steel up to temperatures of 1200° F. (649° C., 922° K).

Silicon carbide as a second phase component can be added to either of these alloys in order to create a metal matrix composite with enhanced wear characteristics. The resulting composite (where 20% silicon carbide is added to HRA33 above) has been designated HRA35. HRA35 may also be achieved by combining 15% silicon carbide with 10% nickel, 10% cobalt, 10% chromium, 5% manganese with 50% rhenium. In another embodiment, designated HRA24, 5% manganese is used and combined with 20% chromium, 20% silicon carbide, and 55% rhenium.

Tests conducted on these alloys have shown wear resistance in excess of a pressure-velocity (PV) of 750,000 psi-ft/min (pounds square inch-feet/minute).

Additional alloying elements, including vanadium and thorium may add additional wear and/or oxidation-resistance to the rhenium-based alloy. Aluminum oxide, yttrium oxide, and titanium carbide may also provide excellent candidates for second phase materials.

The resulting MMC alloys may be used either as a coating or as the constituent material for the manufactured component. Currently, rhenium is expensive and it may be cost effective to coat less expensive substrates in order to provide wear resistant parts. Such coating processes may be successfully applied to face seals for rotors and the like as well as to gears, shafts, and other moving contact parts. Additionally, the rhenium-based metal matrix composite described herein may lend itself to use as a high temperature structural material in an oxidating elevated temperature environment such as that found in a jet engine. For applications of the instant MMC alloys as coatings, intermediate coatings may be used to enhance adhesion or otherwise between the outer MMC alloy coating and the underlying substrate.

Other embodiments may include other materials for use as substances with an affinity for oxygen but that also partially or completely dissolve in the refractory metal, such as rhenium. The present invention provides a material alloy by which robust and durable parts may be achieved for use in hostile operating conditions such as those in jet engines or the like.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. An oxidation-resistant and wear-resistant metal matrix composite (MMC), comprising:
   a rhenium base oxidation resistant alloy comprising:
      rhenium;
      cobalt;
      chromium;
      manganese; and
   a hard second phase material for use in the formation of a metal matrix composite (MMC); whereby an oxidation rate of a resulting alloy thereof is significantly diminished from that of pure rhenium and an increased resistance to wear is enhanced by the hard second phase material.

2. An oxidation-resistant and wear-resistant metal matrix composite (MMC) as set forth in claim 1, wherein the rhenium farther comprises:
   at least approximately fifty percent (50%) rhenium by atomic percent.

3. An oxidation-resistant and wear-resistant metal matrix composite (MMC) as set forth in claim 1, wherein the cobalt further comprises:
   cobalt by atomic percent in a range from approximately 0% to 50%.

4. An oxidation-resistant and wear-resistant metal matrix composite (MMC) as set forth in claim 1, wherein the chromium further comprises:
   chromium by atomic percent in a range from approximately 0% to 15%.

5. An oxidation-resistant and wear-resistant metal matrix composite (MMC) as set forth in claim 1, wherein the manganese further comprises:
   manganese by atomic percent in a range from approximately 0% to 10%.

6. An oxidation-resistant and wear-resistant metal matrix composite (MMC) as set forth in claim 1, further comprising:
   nickel.

7. An oxidation-resistant and wear-resistant metal matrix composite (MMC) as set forth in claim 6, wherein the nickel further comprises:
   nickel by atomic percent in a range from approximately 0% to 15%.

8. An oxidation-resistant and wear-resistant metal matrix composite (MMC) as set forth in claim 1, wherein the oxidation rate is reduced or approximately zero up to 1200° F. compared to pure rhenium.

9. An oxidation-resistant and wear-resistant metal matrix composite (MMC) as set forth in claim 1, further comprising elements selected from the group consisting of:
   vanadium, silicon, aluminum, yttrium, and thorium.

10. An oxidation-resistant and wear-resistant metal matrix composite (MMC) as set forth in claim 1, wherein the hard second phase material is ceramic.

11. An oxidation-resistant and wear-resistant metal matrix composite (MMC) as set forth in claim 1, wherein the hard second phase material is a carbide.

12. An oxidation-resistant and wear-resistant metal matrix composite (MMC) as set forth in claim 11, wherein the hard second phase material further comprises materials selected from the group consisting of:

silicon carbide, tungsten carbide, titanium carbide, and boron carbide.

13. An oxidation-resistant and wear-resistant metal matrix composite (MMC), comprising:
   approximately forty-five and five-sixths percent (45 and 5/6%) rhenium by atomic percent;
   approximately sixteen and two-thirds percent (16 and 2/3%) cobalt by atomic percent;
   approximately eight and one-third percent (8 and 1/3%) chromium by atomic percent;
   approximately eight and one-third percent (8 and 1/3%) nickel by atomic percent; and
   approximately four and one-sixth percent (4 and 1/6%) manganese by atomic percent; and
   approximately sixteen and two-thirds percent (16 and 2/3%) silicon carbide by atomic percent; whereby
      an oxidation rate of a resulting alloy thereof is approximately zero up to 1200° F. and a lower rate thereafter compared to pure rhenium and a metal matrix composite is achieved having enhanced wear characteristics.

14. An oxidation-resistant and wear-resistant metal matrix composite (MMC) as set forth in claim 13, further comprising elements selected from the group consisting of:
   vanadium, silicon, aluminum, yttrium, and thorium.

15. An oxidation-resistant and wear-resistant metal matrix composite (MMC), comprising:
   approximately fifty percent (50%) rhenium by atomic percent;
   approximately ten percent (10%) cobalt by atomic percent;
   approximately ten percent (10%) chromium by atomic percent;
   approximately ten percent (10%) nickel by atomic percent;
   approximately five percent (5%) manganese by atomic percent; and
   approximately fifteen percent (15%) silicon carbide by atomic percent; whereby
      an oxidation rate of a resulting alloy thereof is approximately zero up to 1200° F. and a lower rate thereafter compared to pure rhenium and a metal matrix composite is achieved having enhanced wear characteristics.

16. An oxidation-resistant and wear-resistant metal matrix composite (MMC) as set forth in claim 15, further comprising elements selected from the group consisting of:
   vanadium, silicon, aluminum, yttrium, and thorium.

17. An oxidation-resistant and wear-resistant metal matrix composite (MMC), comprising:
   a rhenium base oxidation-resistant alloy, comprising:
      rhenium; and
      an alloying substance with an affinity for oxygen, the alloying substance at least partially soluble in rhenium, the alloying substance at least partially dissolved in the rhenium; and
   a hard second phase material for use in the formation of a rhenium base metal matrix composite (MMC);
   whereby an enhanced wear-resistant metal matrix composite is produced by the presence of the hard second phase material embedded in the rhenium base oxidation-resistant alloy.

18. An oxidation-resistant and wear-resistant metal matrix composite (MMC) as set forth in claim 17, further comprising:
   the rhenium being at least 50% rhenium by atomic percent.

19. An oxidation-resistant and wear-resistant metal matrix composite (MMC) as set forth in claim 17, further comprising:
   the alloying substance being a mixture of at least cobalt, chromium, and manganese.

20. An oxidation-resistant and wear-resistant metal matrix composite (MMC) as set forth in claim 19, further comprising:
   the cobalt being cobalt by atomic percent in a range from approximately 0% to 50%.

21. An oxidation-resistant and wear-resistant metal matrix composite (MMC) as set forth in claim 19, further comprising:
   the chromium being chromium by atomic percent in a range from approximately 0% to 50%.

22. An oxidation-resistant and wear-resistant metal matrix composite (MMC) as set forth in claim 19, further comprising:
   the manganese being manganese by atomic percent in a range from approximately 0 to 10%.

23. An oxidation-resistant and wear-resistant metal matrix composite (MMC) as set forth in claim 19, further comprising:
   nickel.

24. An oxidation-resistant and wear-resistant metal matrix composite (MMC) as set forth in claim 23, further comprising:
   the nickel being nickel by atomic percent in a range from approximately 0% to 15%.

25. An oxidation-resistant and wear-resistant metal matrix composite (MMC) as set forth in claim 17, further comprising elements selected from the group consisting of:
   vanadium, silicon, aluminum, yttrium, and thorium.

26. An oxidation-resistant and wear-resistant metal matrix composite (MMC) as set forth in claim 17, wherein the hard second phase material is ceramic.

27. An oxidation-resistant and wear-resistant metal matrix composite (MMC) as set forth in claim 17, wherein the hard second phase material is a carbide.

28. An oxidation-resistant and wear-resistant metal matrix composite (MMC) as set forth in claim 17, wherein the hard second phase material further comprises materials selected from the group consisting of:
   silicon carbide, tungsten carbide, titanium carbide, and boron carbide.

29. An oxidation-resistant and wear-resistant metal matrix composite (MMC), comprising:
   a rhenium base oxidation-resistant alloy, comprising:
      rhenium; and
      an alloying substance with an affinity for oxygen, the alloying substance at least partially soluble in rhenium, the alloying substance at least partially dissolved in the rhenium and including a mixture of at least cobalt, chromium, and manganese;
         the cobalt being cobalt by atomic percent in a range from approximately 0% to 50%;
         the chromium being chromium by atomic percent in a range from approximately 0% to 20%; and
         the manganese being manganese by atomic percent in a range from approximately 0% to 10%; and
   a hard second phase material for use in the formation of a metal matrix composite (MMC), the hard second phase selected from the group consisting of silicon carbide tungsten carbide, titanium carbide, and boron carbide, the hard second phase material being present in the MMC by atomic percent in a range from approximately 0% to 30%;

whereby an enhanced wear-resistant metal matrix composite is produced by the presence of the hard second phase material embedded in the alloy.

30. An oxidation-resistant and wear-resistant metal matrix composite (MMC) as set forth in claim 29, further comprising:

the rhenium being approximately at least 40% rhenium by atomic percent.

31. An oxidation-resistant and wear-resistant metal matrix composite (MMC) as set forth in claim 29, further comprising:

nickel, the nickel being nickel by atomic percent in a range from approximately 0% to 15%.

32. An oxidation-resistant and wear-resistant metal matrix composite (MMC), comprising:

approximately fifty-five percent (55%) rhenium by atomic percent;

approximately twenty percent (20%) chromium by atomic percent;

approximately five percent (5%) manganese by atomic percent; and approximately twenty percent (20%) silicon carbide by atomic percent; whereby an oxidation rate of a resulting alloy thereof is significantly diminished up to 1200° F. and a lower rate thereafter compared to pure rhenium and a metal matrix composite is achieved having enhanced wear characteristics.

33. An oxidation-resistant and wear-resistant metal matrix composite (MMC) comprising:

a rhenium base oxidation resistant alloy comprising:
at least fifty percent (50%) rhenium by atomic percent; and
cobalt; and a hard second phase material for use in the formation of a rhenium base metal matrix composite (MMC); whereby an oxidation rate of a resulting alloy thereof is significantly diminished from that of pure rhenium and an increased resistance to wear is enhanced by the hard second phase material.

* * * * *